United States Patent [19]

Wozniak

[11] Patent Number: 5,071,899
[45] Date of Patent: Dec. 10, 1991

[54] ANTI-STAT FOR POLYVINYL CHLORIDE POLYMERS

[75] Inventor: Don S. Wozniak, Powell, Ohio

[73] Assignee: Sherex Chemical Company, Inc., Dublin, Ohio

[21] Appl. No.: 474,532

[22] Filed: Feb. 2, 1990

Related U.S. Application Data

[60] Division of Ser. No. 373,717, Jun. 29, 1989, Pat. No. 4,906,681, which is a continuation-in-part of Ser. No. 76,393, Jul. 22, 1987, abandoned.

[51] Int. Cl.$^5$ .............................................. C08K 5/11
[52] U.S. Cl. .................................... 524/314; 524/285; 524/296; 524/297; 524/310; 524/315; 524/317; 524/376; 524/378; 524/910; 524/911
[58] Field of Search ............... 524/285, 296, 297, 310, 524/314, 315, 317, 376, 378, 910, 911

[56] References Cited

U.S. PATENT DOCUMENTS 4,061,869 12/1977 Schwarze .......................... 524/910
4,165,303 8/1979 Schlossman ....................... 524/910

FOREIGN PATENT DOCUMENTS 3046713 9/1981 Fed. Rep. of Germany ...... 524/315
1018262 1/1966 United Kingdom ................ 524/376

Primary Examiner—Joseph L. Schofer
Assistant Examiner—Peter D. Mulcahy
Attorney, Agent, or Firm—Scully, Scott, Murphy & Presser

[57] ABSTRACT

Disclosed is an anti-stat which is effective in polyvinyl chloride polymeric parts to dissipate charge phenomena occurring at a surface thereof. The anti-stat comprises an ethoxylated fat-forming alcohol and a dibasic acid-capped fat-forming alcohol which is incorporated in an effective amount in the polyvinyl chloride polymeric material.

10 Claims, No Drawings

ANTI-STAT FOR POLYVINYL CHLORIDE POLYMERS

This is a divisional of copending application Ser. No. 373,717, filed on June 29, 1989, now U.S. Pat. No. 4,906,681, which is a continuation in part of U.S. Ser. No. 076,393 filed 7/22/87 now abandoned.

BACKGROUND OF THE INVENTION

The present invention relates to polyvinyl chloride (hereinafter PVC) polymeric substrates and more particularly to a new anti-stat blend therefor.

The accumulation of static electricity on parts can lead to many problems. One problem is that static electricity build-up on a part causes dirt or other particulate matter to be attracted and adhere to the surface of the part. In some manufacturing environments, such dirt or other particulate matter can lead to difficulties in manufacturing, lowering of performance of certain parts, and other associated problems. Another problem associated with static electricity build-up is the danger that electrical and electronic components coming into contact with such charge build-up can become damaged thereby.

A further problem associated with static charge build-up involves safety concerns. Some manufacturing and other service areas express a high risk of a severe explosion hazard, such as, for example, in operating theaters of hospitals, in paint shops, in chemical manufacturing areas, and like environments. It will be appreciated that potential explosive environments pervade such locations, including, for example, oxygen, volatile organic solvents, and like material which may be susceptible to fire or explosion. The prevention of static electricity build-up on parts used in such environments is desirable.

While anti-static topical treatment of polymeric parts has been proposed, such topical treatments are subject to erosion with attendant loss of activity. Another proposal for dissipating static electricity involves the incorporation of an anti-static agent or anti-stat as an internal additive in the polymer during its processing. While some anti-stats have enjoyed acceptance in the marketplace, the particular problem in developing acceptable anti-stats for PVC polymers has arisen because conventional anti-stats are formulated from ethoxylated amines and quaternary ammonium compounds. Such nitrogen-containing materials, however, tend to adversely affect PVC and, thus, their use in PVC is not recommended. Other PVC anti-stats in the marketplace include glycerol mono-oleate, glycerol mono-stearate, polyoxyethylene sorbitan mono-laurate, diethylene glycol laurate, and polyethylene glycol mono-stearate. Several of these materials are disclosed in U.S. Pat. No. 3,145,187.

Another problem facing anti-stats, including internal additives, involves the degree of plasticization of the PVC part. Some conventional PVC anti-stats function quite effectively at moderate to high plasticizer levels. However, when the plasticizer level is diminished to make a semi-rigid or rigid part, the anti-stat fails in its effectiveness. Apparently, the combination of plasticizer and anti-stat is necessary in order for the requisite charge dissipation to be realized. Thus, an anti-stat effective in flexible, semi-rigid, and rigid PVC material is desired by the art.

BROAD STATEMENT OF THE INVENTION

The present invention is directed to an anti-stat which is added internally to PVC polymeric material and which does not undesirably interact with the PVC when added thereto. The method for dissipating charge phenomena occurring at PVC polymeric substrates in accordance with the present invention comprises incorporating into the substrate an effective amount of an anti-stat comprising an ethoxylated fatty alcohol and a dibasic acid-capped fatty alcohol. A polyvinyl chloride polymeric substrate containing an effective amount of the anti-stat blend comprises another embodiment of the present invention. The effective amount of said anti-stat broadly ranges from about 2 to 15 weight parts per 100 weight parts of PVC resin. The PVC substrate can contain a plasticizer or can be plasticizer-free.

Advantages of the present invention include an anti-stat which is incorporated into the bulk of the polymeric material for increasing the useful anti-stat life of the PVC part manufactured therefrom. Another advantage is an anti-stat blend which exhibits excellent compatibility and processability with PVC polymeric materials. Yet another advantage is an anti-stat blend which functions effectively in semi-rigid and rigid PVC formulations. These and other advantages will be readily apparent to those skilled in the art based upon the disclosure contained herein.

DETAILED DESCRIPTION OF THE INVENTION

Properties desired in an anti-stat for PVC include compatibility/clarity with the PVC resin as well as preservation of heat stability and other processing properties which the PVC plastic exhibits. The anti-stat of the present invention is compatible with the PVC and does not adversely affect heat stability/clarity and other processing properties. Additionally, the anti-stat of the present invention as an internal additive is quite effective for dissipating charge phenomena occurring at the PVC polymeric substrate. Charge phenomena often is called static electricity or static charge build-up in the art. In this regard, certain standards have been evolved regarding the dissipation of charge phenomena occurring at polymeric or plastic substrates. One such standard is set forth in Military Specification B81705B which specification utilizes Federal Test Methods 101C, Method 4046, which requires a reduction in charge to 0% of the initial value (typically 5,000 v) to be achieved within a maximum of two seconds.

Another unique characteristic of the novel anti-stat is its effectiveness in the presence of low levels of plasticizer and in the absence of plasticizer. In fact, though the anti-stat does dissipate charge effectively in plasticized PVC formulations, charge dissipation can be improved by lowering the level of plasticizer. Such result is surprising in view of the fact that the ethoxylated fatty alcohol component of the exhibits the reverse trend when used an an anti-stat agent alone. Another unique attribute of the anti-stat is the fact that the two components are much more effective when incorporated into the PVC material in combination rather than in pre-reacted form. This is surprising since PVC material is processed typically at about 300° F. and tin mercaptide heat stabilizer often are utilized in commerical PVC formulations. Thus, reaction conditions including temperature and catalyst for promoting the reaction of the two components are typical in processing PVC material. This means, though unconfirmed, that the components of the blend may react in situ during processing of the polymeric formulation. Thus, the novel anti-stat exhibits synergistic characteristics.

Referring to the ethoxylated fatty alcohol component of the blend, fat-forming or long chain alcohols include mono-alcohols and polyols. The term "fat-forming" is indicative of an alcohol of suitable chain length to be termed a "fatty alcohol" but where the source of the alcohol may be other than a natural source. Broadly, such fat-forming or fatty alcohols exhibit a chain length of greater than $C_8$, advantageously the chain length ranges from about $C_8$ to $C_{36}$, and preferably is between about $C_{10}$ and $C_{18}$. While the fatty alcohol component can be unsaturated (e.g. oleyl alcohol), the PVC art teaches that unsaturated additives can be deleterious to the PVC resin, thus fully saturated fatty alcohols may be desirable. The fatty alcohol component may be linear or branched in structure, as well as substituted with a variety of substituents including alkyl groups, ester groups, ether groups, halide, and the like. Examples of such substituted fatty alcohols include, for example, partial glycerides of fatty acids, glycol esters of fatty acids, and the like and mixtures thereof.

The fatty alcohol feedstock for use in making the components of the novel anti-stat blend may be derived from naturally-occurring materials or may be synthetic. Naturally-occurring fatty materials suitable for deriving fat-forming fatty alcohols include, for example, vegetable oils (including nut), animal fat, fish oil, tall oil, and the like. The fat-forming alcohols also may be derived from petroleum sources. Formation of fatty alcohols from such feedstock sources is well known in the art.

The number of moles of ethylene oxide added to the fatty alcohol can range from as little as 2 moles on up to 30 or moles of ethylene oxide per mole of fatty alcohol. A useful range has been determined to be from about 2 to 20 moles of ethylene oxide per mole of fatty alcohol. Details on this reaction can be found in Schick, *Nonionic Surfactants*, Chapter 2, Marcel Decker, Inc., New York, N.Y. (1966). The preferred ethylene oxide-modified fatty alcohol can be represented as follows:

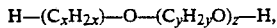

$$H—(C_xH_{2x})—O—(C_yH_{2y}O)_z—H,$$

where
x=8–36,
y=2,
z=2–30.

The foregoing description of fat-forming or long chain alcohols also applies to the second component of the blend. The dibasic acid-capped fat-forming or alcohol desirably is made by reacting an excess of dibasic acid (or anhydride thereof) with the fatty alcohol under conventional esterification conditions. The anhydride is preferred in order to utilize mild reaction conditions. Suitable dibasic acids (or anhydrides) include, for example, oxalic anhydride, maleic anhydride, phthalic anhydride, succinic anhydride, glutaric anhydride, dimerized fatty acids, and the like and mixtures thereof. A slight to moderate excess of acid can be utilized, but is not preferred. This reaction is so common that no further citation is needed. A general structure for this component of the anti-stat is as follows:

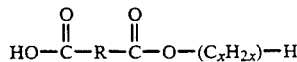

$$HO—\overset{O}{\underset{\|}{C}}—R—\overset{O}{\underset{\|}{C}}—O—(C_xH_{2x})—H$$

where R is an aromatic group or a $C_2$–$C_{36}$ aliphatic group. It should be recognized, however, that the reaction product of the esterification reaction likely is a mixture, i.e. diester, mono-ester, unreacted reactants, etc..

The effective amount of the anti-stat broadly ranges from about 2 to 15 weight parts per 100 weight parts of PVC resin. Within the anti-stat combination itself, each component should be present in an effective amount which broadly ranges from about 1 to 10 weight parts per 100 weight parts of PVC resin. The chemical composition of each component of the anti-stat, the precise formulation of PVC material utilized, additives incorporated into the bulk of the PVC polymeric material, thickness of the substrate being milled, and like variables will affect the amount of anti-stat blend required in order to achieve the charge dissipation level desired. In this regard, a distinct advantage of the novel anti-stat is the clarity of the resulting PVC substrate. That is, the anti-stat at an effective amount results in a PVC substrate which possesses good optical clarity making such part useful in a variety of packaging configurations, including electronic packaging configurations.

PVC polymeric substrates advantageously are PVC homopolymers, though PVC copolymers are included for present purposes. PVC copolymers can be formulated from other ethylenically unsaturated monomers including, for example, vinyl esters, olefins, a wide variety of acrylics and acrylates, and the like and mixtures thereof. Additionally, the PVC polymeric substrate may be compounded as a semi-rigid flexible material or as a rigid material taking the form of a molded article, sheet, laminate, or other form. In this regard, it will be observed that the anti-stat effectiveness of the synergistic blend improves as the plasticizer level is decreased in the PVC formulation. The plasticizer level typically will not exceed about 25 weight per 100 weight parts of PVC resin with plasticizer levels between about 0 and 25 weight parts being encountered in typical commercial rigid and semi-rigid PVC formulations.

Additionally, a wide variety of additives typically are included in the PVC polymeric substrates. One class of additives typically are labeled as inerts, extenders, fillers, or the like. These ingredients include inorganic pigments including, for example, various clays, calcium carbonate, zinc oxide, barium sulfate, chromium oxide, iron oxide, lead chromate, zinc chromate, diatomaceous earth, glass fiber, glass powder, pigmentary titanium dioxide, and the like and mixtures thereof. Such inorganic pigments may be treated for improving dispersibility in the PVC additionally. Other conventional additives which can be included in the PVC polymeric substrates include, for example, catalysts, initiators, anti-oxidants, blowing agents, UV stabilizers, organic pigments including tinctorial pigments, leveling agents, flame-retardants, anti-cratering additives, impact modifiers, and the like. As noted above, each of these additives may impact the effectiveness of the novel anti-stat blend of the present invention anticipating charge phenomena occurring at PVC polymeric substrates.

The anti-stat is incorporated into the bulk ingredients of the PVC material in conventional fashion along with other ingredients or as a separate addition as is necessary, desirable, or convenient. The components of the anti-stat can be formed into a blend for incorporation into the PVC material, or can be added separately, either simultaneously or sequentially. The PVC polymeric substrate may be conventionally milled, molded, or processed by a variety of techniques well known in the art. Regardless of the method of fabricating the polymeric part containing the anti-stat, such treated part exhibits improved charge phenomena dissipation as described herein. Thus, such parts will be more recalcitrant to dirt pick-up, spark discharge resulting in damage to electronic components, or ignition of volatile material in proximity thereto, and like adverse consequences which charge phenomena may cause.

The following examples show how the present invention can be practiced, but should not be construed as limiting. In this application, all percentages and proportions are by weight and all citations referred to herein are expressly incorporated herein by reference.

IN THE EXAMPLES

Samples in the Examples were milled at about 320° F./300° F. to make 3.5 in. by 5.5 in. sheets having a nominal thickness of about 55 mils, unless otherwise indicated. Charge phenomena dissipation was conducted on the samples which were placed in a Faraday cage and charged to 5,000 volts with a Model 406C static decay meter (supplied by Electro-Tech Systems, Glenside, Pa.). A volt meter was used to record the elapsed time for the samples to have dissipated 90% of the initial 5,000 volt charge (10% cut-off) or 100% of the initial 5,000 volt charge, as indicated (0% cut-off). The samples had been conditioned for at least 72 hours in the Faraday cage at about 74° F. and 14% relative humidity prior to evaluation, unless otherwise indicated in the Examples.

The following abbreviations are used in the Examples:

VC 47B is a PVC homopolymer (relative viscosity 2.28, inherent viscosity conversion 0.99, 0.5% volatiles max, 0.5 g/cc density), Borden, Inc., Columbus, Ohio.

Geon 30 is a PVC homopolymer (inherent viscosity 0.99-1.05, 0.3% volatiles max, 0.50 g/cc density), B.F. Goodrich Co., Cleveland, Ohio.

Meritex is a rigid PVC resin, Meritex Corp., Dallas, Tex.

DOA is di-octyl adipate.

Varstat 10 is an ethoxylate of iso-stearyl alcohol, Sherex Chemical Company, Dublin, Ohio.

Adol 42 oleyl-cetyl alcohols (45-55 IV, 210-225 OH value, 36° C. cloud point), Sherex Chemical Co.

Adol 52 cetyl alcohol (IV 2 max, 220-235 OH value, 45°-50° C. closed tube melting point, 95% $C_{16}$), Sherex Chemical Co.

Adol 61 stearyl alcohol (IV 2 max, 200-212 OH value, 56°-60° C. closed tube melting point, 97% $C_{18}$), Sherex Chemical Co.

Adol 63 cetyl-stearyl alcohols (IV 2 max, 206-218 OH value, 48°-53° C. titer, 65% $C_{18}$), Sherex Chemical Co.

Varionic 400 MS polyethylene glycol 400 monostearate, Sherex Chemical Co. Varionic 1000 MS polyethylene glycol 1000 monostearate, Sherex Chemical Co.

Ferro 6125 is a barium-cadmium-zinc liquid stabilizer, Ferro Corporation, Bedford, Ohio.

Ferro ESO is an epoxidized soybean oil product, Ferro Corporation.

Thermolite RS-31 is a sulfur-containing organotin PVC stabilizer, M & T Chemicals, Rahway, N.J.

Thermolite 108 is a sulfur-containing organotin PVC stabilizer, M & T Chemicals.

Vikoflex 7170 is an epoxidized soybean oil product, Viking Chemical Company, Minneapolis, Minn.

Blendex 336 is a PVC acrylic impact modifier, Rohm & Haas Co., Philadelphia, Pa.

EXAMPLES

Example 1

The efficacy of the ethoxylated fatty alcohol/acid terminated fatty alcohol blend was demonstrated by milling a PVC formulation at 320° F. to make 55 mil sheets.

TABLE 1

| Ingredient | Formulations (wt-parts) | | |
|---|---|---|---|
| | 139-3 (Control) | 139-1 | 139-2 |
| VC 47B PVC | 100 | 100 | 100 |
| DOA | 10 | 10 | 10 |
| Ferro 6125 | 3 | 3 | 3 |
| Mineral Oil | 0.4 | 0.4 | 0.4 |
| Varstat 10 | 4 | 4 | 4 |
| SC 172-197* | — | 2 | 4 |
| Adol 42 | 4 | — | — |

*Adol 42 oleyl alcohol (1 wt. eq.) reacted with phthalic anhydride (2 wt. eq.) to 136° C. for 15 minutes, theoretical A.V. = 135.5, titrated A.V. = 130.

After the sample were conditioned, they were subjected to charge dissipation testing as follows:

TABLE 2

| Sample No. | Initial Charge (KV) | Applied Charge (KV) | Decay Rate (sec.) | | | | | |
|---|---|---|---|---|---|---|---|---|
| | | | +5 KV | | | −5 KV | | |
| | | | +1 | +2 | +3 | −1 | −2 | −3 |
| 10% Cut-off | | | | | | | | |
| 139-3 (Control) | 0 | 5 | 1.75 | 1.78 | 1.76 | 1.85 | 1.91 | 2.11 |
| 139-1 | −1.25 | 5 | 10.86 | 12.82 | 13.14 | 15.26 | 17.78 | 17.12 |
| 139-2 | 0 | 5 | 1.40 | 1.49 | 1.34 | 1.37 | 1.42 | 1.39 |
| 0% Cut-off | | | | | | | | |
| 139-3 (Control) | 0 | 5 | 4.90 | 4.46 | 4.61 | 6.01 | 7.83 | 7.83 |
| 139-2 | 0 | 5 | 8.08 | 8.32 | 13.46 | 3.61 | 3.82 | 4.01 |

These data demonstrate the effectiveness of the control ethoxylated fatty alcohol/fatty alcohol blend as an anti-stat. However, such samples also evidence spew which makes them unsuitable for a variety of sensitive uses, such as in the electronics industry. An effective amount of the novel anti-stat blend was present in Sample No. 139-2 for 90% charge dissipation (10% cut-off)

in less than 2 seconds. Also, neither inventive sample evidenced spew when held in a humidity spew oven for 24 hours at 72°.

Example 2

The capped fatty alcohols in this example were sample no. 201-13-1 succinic anhydride capped Adol 42 oleyl alcohol (2:1 wt. eq ratio, respectively) and sample no. 201-13-2 glutaric anhydride capped Adol 42 oleyl alcohol (2:1 wt. eq. ratio respectively). The following formulations were milled.

TABLE 3

| Ingredient | Formulations (wt-parts) | | | | |
|---|---|---|---|---|---|
|  | 107-1 | 107-2 | 107-3* | 108-1 | 108-2 |
| VC 47B PVC | 100 | 100 | 100 | 100 | 100 |
| DOA | 10 | 10 | 10 | 10 | 10 |
| Mineral Oil | 0.4 | 0.4 | 0.4 | 0.4 | 0.4 |
| Thermolite RS-31 | 3 | 3 | — | 3 | 3 |
| Ferro 6125 | — | — | 3 | — | — |
| Varstat 10 | 4 | 4 | 4 | 4 | 4 |
| 201-13-1 | 2 | 4 | 4 | — | — |
| 201-13-2 | — | — | — | 2 | 4 |

*Cloudy sample, all other samples clear

After conditioning, two different film thickness samples were evaluated as follows:

TABLE 4

| Sample No. | Thickness (mm) | Initial Charge (KV) | Applied Charge (KV) | Decay Rate (sec.) | | | | | |
|---|---|---|---|---|---|---|---|---|---|
|  |  |  |  | +5 KV | | | −5 KV | | |
|  |  |  |  | +1 | +2 | +3 | −1 | −2 | −3 |
| 107-1 | 10 | −0.15 | ±5 | 6.71 | 6.59 | 6.79 | 7.13 | 7.21 | 7.29 |
| 107-1 | 55 | −2.25 | ±5 | 15.56 | 18.03 | 18.96 | 21.08 | >20 | >20 |
| 107-2 | 10 | −0.75 | ±5 | 21.90 | 22.25 | 22.14 | 21.79 | >20 | >20 |
| 107-2 | 55 | 0 | ±5 | 1.92 | 1.94 | 2.02 | 2.21 | 2.27 | 2.19 |
| 107-3 | 10 | 0 | ±5 | 3.96 | 4.10 | 4.07 | 3.97 | 4.12 | 4.16 |
| 107-3 | 55 | 0 | ±5 | 1.92 | 1.92 | 1.89 | 2.04 | 2.09 | 2.13 |
| 108-1 | 10 | −2.00 | ±5 | 15.97 | 18.36 | 19.20 | 21.26 | >20 | >20 |
| 108-1 | 55 | −3.25 | ±5 | 23.69 | >20 | >20 | 31.52 | >30 | >30 |
| 108-2 | 10 | −0.10 | ±5 | 4.45 | 4.40 | 4.49 | 4.55 | 4.67 | 4.68 |
| 108-2 | 55 | — | ±5 | 1.84 | 1.94 | 1.98 | 2.01 | 2.05 | 2.12 |

These data demonstrate the effect of film thickness on charge dissipation. At the thicker film thicknesses, effective levels of the anti-stat blend are demonstrated to be effective in dissipating the applied charge in less than about 2 sec. Moreover, none of the samples evidenced spew. Even at the thinner film thicknesses tested, a charge dissipation of about 4 sec.

Example 3

The anti-stat blend of Example 1 was evaluated in two different PVC formulations.

TABLE 5

| Ingredient | Formulations (wt-parts) | |
|---|---|---|
|  | 20-1 | 20-2 |
| VC 47B PVC | 100 | — |
| Geon 30 PVC | — | 100 |
| DOA | 10 | 10 |
| Ferro 6125 | 3 | 3 |
| Mineral Oil | 0.4 | 0.4 |
| Varstat 10 | 4 | 4 |
| SC172-197 | 4 | 4 |

All samples were clear. Sample 20-1 exhibited a Shore D hardness value of 73. After conditioning, the following decay data was recorded.

TABLE 6

| Sample No. | Decay Time (sec) | |
|---|---|---|
|  | Avg. Value for +5 KV Applied | Avg. Value for −5 KV Applied |
| 10% Cut-off | | |
| 20-1 | 0.80 | 0.98 |
| 20-2 | 1.97 | 2.08 |

The formulations tested are good commercial systems which meet the clarity, spew, and charge dissipation requirements desired. Note that the particular PVC resin used will effect the charge dissipation capabilities of the samples.

Example 4

The effect of lowering the plasticizer level for making more rigid PVC sheets was tested with respect of charge dissipation. The anti-stat blend comprised sample no. 201-52-3 maleic anhydride capped Adol 42 oleyl alcohol (1:2 wt. et. ratio) and sample no. 187-80-2 10 mole ethoxylate of iso-stearyl alcohol.

TABLE 7

| Ingredient | Formulations (wt-parts) | | |
|---|---|---|---|
|  | 195-1 | 195-2 | 195-3 |
| VC 47B PVC | 100 | 100 | 100 |
| DOA | 5 | 3 | 1 |
| Mineral Oil | 0.4 | 0.4 | 0.4 |
| Thermolite 108 | 3 | 3 | 3 |
| 201-52-3 | 4 | 4 | 4 |
| 187-80-2 | 4 | 4 | 4 |

On a PVC weight basis, the anti-stat blend was used at 4 wt-parts for each component and the plasticizer level varied at 5, 3, and 1 wt-part for samples 195-1, 195-2, and 195-3, respectively. Charge dissipation was conducted on samples at various time intervals of conditioning at 80° F. and 14% relative humidity.

TABLE 8

| Sample No. | Decay Time (sec)* | |
|---|---|---|
|  | +5 KV | −5 KV |
| 10% Cut-off | | |
| 0 Hr. Conditioning | | |
| 195-1 | 0.72 | 0.75 |
| 195-2 | 0.47 | 0.50 |
| 195-3 | 0.35 | 0.37 |
| 24 Hr. Conditioning | | |
| 195-1 | 0.78 | 0.83 |
| 195-2 | 0.57 | 0.63 |
| 195-3 | 0.36 | 0.41 |
| 7 Day Conditioning | | |
| 195-1 | 0.86 | 1.00 |
| 195-2 | 0.75 | 0.83 |

TABLE 8-continued

| Sample | Decay Time (sec)* | |
|---|---|---|
| No. | +5 KV | −5 KV |
| 195-3 | 0.40 | 0.43 |

*Average for 3 samples.

These data demonstrate that the charge dissipation capabilities of the samples containing the novel anti-stat blend improved by lowering the level of plasticizer. This trend is not observed unless both of the components of the blend are used. This can be seen by referring to the following comparative formulations using the Varstat 10 ethoxylated iso-stearyl alcohol component alone.

TABLE 9

| | Formulations (wt-parts) | |
|---|---|---|
| Ingredient | 97-1 | 97-2 |
| VC 47B PVC | 100 | 100 |
| DOA | 21 | 16 |
| Vikoflex 7170 | 4 | 4 |
| Ferro 6125 | 3 | 3 |
| Mineral Oil | 0.4 | 0.4 |
| Varstat 10 | 4 | 4 |

TABLE 10

| Sample | Decay Rate (sec) | | | | | |
|---|---|---|---|---|---|---|
| | +5 KV | | | −5 KV | | |
| No. | 1 | 2 | 3 | 1 | 2 | 3 |
| 97-1 | 3.12 | 2.95 | 2.96 | 2.94 | 2.97 | 2.82 |
| 97-2 | 11.74 | 12.12 | 11.59 | 11.84 | 12.66 | 12.02 |
| 0% Cut-off | | | | | | |
| 97-1 | 7.47 | 6.99 | 6.87 | 7.48 | 7.20 | 7.13 |
| 97-2 | 28.18 | 28.01 | 37.69 | 33.11 | 32.26 | 29.47 |
| 10% Cut-off | | | | | | |

Thus, the uniqueness of the inventive anti-stat system is demonstrated relative to its effectiveness at lower plasticizer levels.

Example 5

In order to demonstrate the synergism of the anti-stat blend, comparative formulations were made using the ethoxylated fatty alcohol alone, in combination with other alcohols, and an acid-capped alcohol. The following formulations were evaluated.

TABLE 11

| | Formulations (wt-parts) | | |
|---|---|---|---|
| Ingredient | 89-1 | 89-2 | 89-3 |
| VC 47B PVC | 100 | 100 | 100 |
| DOA | 10 | 10 | 6 |
| Ferro ESO | 4 | 4 | 4 |
| Ferro 6125 | 3 | 3 | 3 |
| Mineral Oil | 0.4 | 0.4 | 0.4 |
| Varstat 10 | 4 | 4 | 4 |
| 2-Ethyl Hexanol | 4 | — | — |
| Adol 42 | — | 4 | 4 |

TABLE 12

| | Formulations (wt-parts) | | | | | | | | | | | |
|---|---|---|---|---|---|---|---|---|---|---|---|---|
| Ingredient | 78-1 | 78-2 | 86-1 | 86-2 | 86-3 | 86-4 | 86-5 | 86-6 | 86-7 | 86-8 | 86-9 | 86-10 |
| Meritex | 100 | 100 | 100 | 100 | 100 | 100 | 100 | 100 | 100 | 100 | 100 | 100 |
| 172-117* | 3 | 6 | — | — | — | — | — | — | — | — | — | — |
| Varstat 10 | — | — | — | 6 | 6 | 6 | 6 | 6 | 6 | 6 | 6 | 6 |
| Adol 63 | — | — | — | — | 3 | 6 | — | — | — | — | — | — |
| Adol 61 | — | — | — | — | — | — | 3 | 6 | — | — | — | — |
| Adol 42 | — | — | — | — | — | — | — | — | 3 | 6 | — | — |
| Adol 85 | — | — | — | — | — | — | — | — | — | — | 3 | 6 |

*Maleic anhydride capped Varstat 10

TABLE 13

| | Formulations (wt-parts) | | | | | | | |
|---|---|---|---|---|---|---|---|---|
| Ingredient | 87-1 | 87-2 | 87-3 | 87-4 | 87-5 | 87-6 | 87-7 | 87-8 |
| Meritex | 100 | 100 | 100 | 100 | 100 | 100 | 100 | 100 |
| Varstat 10 | 3 | 3 | 6 | 3 | 6 | 3 | 6 | 3 |
| Adol 63 | 3 | — | — | — | — | — | — | — |
| Adol 61 | — | 3 | — | — | — | — | — | — |
| Adol 52 | — | — | 3 | 3 | — | — | — | — |
| Varonic 400 MS | — | — | — | — | 3 | 3 | — | — |
| Varonic 1000 MS | — | — | — | — | — | — | 3 | 3 |

The 89 series of samples were milled to 55 mil films while the 78, 86 and 87 series were 10 mil films after conditioning, the samples were subjected to testing as follows:

TABLE 14

| Sample No. | Initial Charge (KV) | Applied Charge (KV) | Decay Rate (sec.) | | | | | |
|---|---|---|---|---|---|---|---|---|
| | | | +5 KV | | | −5 KV | | |
| | | | +1 | +2 | +3 | −1 | −2 | −3 |
| 10% Cut-off | | | | | | | | |
| 89-1 | −3.25 | ±5 | 23.05 | 23.9 | 32.05 | 33.77 | 54.13 | 58.68 |
| 89-2 | 0 | ±5 | 2.01 | 1.90 | 1.88 | 1.97 | 2.01 | 2.01 |
| 89-3 | −1.5 | ±5 | 13.28 | 18.09 | 23.39 | 34.17 | 83.65 | 102.5 |
| 0% Cut-off | | | | | | | | |
| 78-1 | −0.25 | 4 | >60 | >60 | >60 | >60 | >60 | >60 |
| 78-2 | 0 | 4.75 | 38.33 | 43.22 | 44.13 | 51.55 | 57.03 | 42.10 |

TABLE 14-continued

| Sample No. | Initial Charge (KV) | Applied Charge (KV) | Decay Rate (sec.) +5 KV | | | Decay Rate (sec.) −5 KV | | |
|---|---|---|---|---|---|---|---|---|
| | | | +1 | +2 | +3 | −1 | −2 | −3 |
| 86-1 | −1.25 | 3.75 | >60 | >60 | >60 | >60 | >60 | >60 |
| 86-2 | 0 | 5 | 21.47 | 22.54 | 23.85 | 27.70 | 29.27 | 32.03 |
| 86-3 | 0 | 5 | 40.57 | 43.81 | 44.15 | 56.38 | 60 | 59.23 |
| 86-4 | −0.25 | 5 | 39.44 | 42.14 | 35.21 | 45.93 | 46.52 | 55.10 |
| 86-5 | 0 | 5 | 12.59 | 14.25 | 12.61 | 16.02 | 16.48 | 16.54 |
| 86-6 | — | — | — | — | — | — | — | — |
| 86-7 | 0 | 5 | 6.26 | 6.68 | 6.59 | 7.19 | 7.63 | 7.33 |
| 86-8 | 0 | 5 | 18.88 | 21.24 | 20.87 | 24.24 | 26.10 | 24.77 |
| 86-9 | −0.25 | 5 | 32.63 | 33.81 | 33.07 | 49.27 | 51.11 | 51.27 |
| 86-10 | 0 | 4.5 | 46.38 | 47.89 | 49.12 | 60.41 | 69.21 | 66.84 |
| 87-1 | −0.4 | 4.5 | >60 | >60 | >60 | >60 | >60 | >60 |
| 87-2 | 0 | 5 | 43.96 | 48.33 | 37.87 | 47.05 | 46.15 | 38.66 |
| 87-3 | −0.5 | 5 | 32.41 | 35.62 | 37.61 | 57.81 | 79.52 | 84.12 |
| 87-4 | −1.5 | 5 | >100 | >100 | >100 | >100 | >100 | >100 |
| 87-5 | −1.0 | 4.75, −3.10 | 62.06 | 83.10 | 91.90 | 113.47 | 101.22 | 138.39 |
| 87-6 | −2.0 | 5 | 72.30 | >60 | >60 | >100 | >100 | >100 |
| 87-7 | −0.25 | 5 | 43.17 | 48.58 | 52.83 | 54.85 | 55.29 | 66.80 |
| 87-8 | −2.25 | 4.25 | >100 | >100 | >100 | >100 | >100 | >100 |

The 89 series demonstrates that a fatty alcohol is more effective than a short chain alcohol, though the decrease in plasticizer results in poorer anti-stat performance. Sample 89-2 evidenced unacceptable high spew. The 78 series demonstrates the ineffectiveness of pre-reacting the capping agent with the ethoxylated fatty alcohol component of the anti-stat blend. The 86 and 87 series demonstrate that increasing either the ethoxylated fatty alcohol or fatty alcohol did not result in acceptable anti-stat performance for the rigid PVC tested. The same result is true for the 87-5 through 87-8 series which used two different polyethylene glycol monostearates in combination with an ethoxylated fatty alcohol.

Example 6

The effect of lowering plasticizer level in the PVC was investigated for several different anti-stat blends.

TABLE 15

| Ingredient | Formulation (wt-parts) | | | | | | |
|---|---|---|---|---|---|---|---|
| | 195-1 | 195-2 | 195-3 | 5-1 | 5-2 | 5-3 | 5-4 |
| VC 47B PVC | 100 | 100 | 100 | 100 | 100 | 100 | 100 |
| DOA | 5 | 3 | 1 | 7 | 5 | 3 | 1 |
| Mineral Oil | 0.4 | 0.4 | 0.4 | 0.4 | 0.4 | 0.4 | 0.4 |
| Thermolite 108 | 3 | 3 | 3 | 3 | 3 | 3 | 3 |
| 201-52-3* | 4 | 4 | 4 | — | — | — | — |
| 178-80-2* | 4 | 4 | 4 | — | — | — | — |
| Adol 42 Phthalate | — | — | — | 4 | 4 | 4 | 4 |
| Varstat 10 | — | — | — | 4 | 4 | 4 | 4 |

*201-52-3 is maleic anhydride capped $C_{10}$ alcohol
178-80-2 is a 10 mole ethoxylate of a $C_{18}$ alcohol.

55 mil sheets were evaluated at three different conditioning times (14% R.H., 80° F.) and the average decay rate for 3 samples each recorded.

TABLE 16

| Sample No. | Avg. Decay Time (sec) +5 KV | | | Avg. Decay Time (sec) −5 KV | | |
|---|---|---|---|---|---|---|
| | Conditioning Time (Days) | | | | | |
| | 0 | 1 | 7 | 0 | 1 | 7 |
| 10% Cut-off | | | | | | |
| 195-1 | 0.72 | 0.78 | 0.86 | 0.75 | 0.83 | 1.00 |
| 195-2 | 0.47 | 0.57 | 0.75 | 0.50 | 0.63 | 0.83 |
| 195-3 | 0.35 | 0.36 | 0.40 | 0.37 | 0.41 | 0.43 |
| 5-1 | 5.96 | 6.95 | 5.92 | 6.62 | 13.80 | 5.36 |
| 5-2 | 10.43 | 11.84 | 26.43 | 17.35 | 26.15 | 37.55 |
| 5-3 | 13.45 | 25.47 | * | 15.97 | 63.42 | * |
| 5-4 | 5.19 | 7.53 | 13.35 | 5.59 | 8.49 | 15.69 |

*Would not accept 4 volt charge.

The maleic capped $C_{12}$ alcohol/$C_{18}$ ethoxylate blend performed better than did the phthalic capped oleyl alcohol/iso-$C_{18}$ ethoxylate blend. Note the excellent anti-stat properties exhibited at only one weight part plasticizer.

Example 7

Further evaluation of the plasticizer level was undertaken by replacing the plasticizer with Blendex 336 impact modifier. The rigid PVC formulation was milled to 55 mil sheets.

TABLE 17

| Ingredient | Formulation (wt-parts) |
|---|---|
| VC 47B PVC | 100 |
| Blendex 336 | 10 |
| Mineral Oil | 0.4 |
| Thermolite 108 | 3 |
| $C_{10}$ Maleate* | 4 |
| $C_{18}$ Ethoxylate (10 mole)** | 4 |

*201-52-3 of Example 6
**178-80-2 of Example 6

The samples were conditioned at 80° F., 14% R.H. for different intervals of time and their anti-stat properties measured for 3 samples each.

TABLE 18

| Sample No. | Average Decay Time (sec) | | | | | |
|---|---|---|---|---|---|---|
| | +5 KV | | | −5 KV | | |
| | Conditioning Time (Days) | | | | | |
| | 0 | 1 | 7 | 0 | 1 | 7 |
| 217-10-1 | 1.25 | 1.60 | 2.59 | 1.61 | 1.62 | 3.09 |

The samples displayed excellent anti-stat properties in a full rigid system unlike the comparative samples of Example 5.

Example 8

A standard formulation was used as follows:

TABLE 19

| Ingredient | Formulation (wt-parts) |
|---|---|
| VC 47B PVC | 100 |
| DOA | 7 |
| Mineral Oil | 0.4 |
| Thermolite 108 | 3 |

The anti-stat blend was made from phthalic anhydride capped Adol 42 fatty alcohol and 2, 5, 10, and 20 mole ethoxylates of fatty alcohols ranging from $C_{10}$ to iso-$C_{18}$ in chain length. The films were 50–55 mils thick and a 10% cut-off value was used.

Each component of the anti-stat blend was used at 4 wt-parts in the standard formulation of Table 19. The following table details the alcohol chain length and number of moles of ethylene oxide used to make the ethoxylated alcohol component of the blend, and decay time data (average for 3 samples) as a function of conditioning time of the samples at 14% relative humidity and about 80° F. temperature.

TABLE 20

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 182-1 | $C_{10}$ | 2 | 11.61 | 33.15 | 131.26 | 14.74 | 43.08 | 193.21 |
| 182-2 | $C_{12}$ | 2 | 4.03 | 5.76 | 10.91 | 5.14 | 5.61 | 17.41 |
| 182-3 | $C_{14}$ | 2 | 3.03 | 3.84 | 5.99 | 3.15 | 3.60 | 7.74 |
| 182-4 | $C_{16}$ | 2 | 2.47 | 3.11 | 5.01 | 2.87 | 3.45 | 6.65 |
| 182-5 | $C_{18}$ | 2 | 1.78 | 2.68 | 3.5 | 1.9 | 2.69 | 4.06 |
| 182-6 | iso-$C_{18}$ | 2 | 5.19 | 5.09 | 7.81 | 5.35 | 7.01 | 10.93 |
| 180-1 | $C_{10}$ | 5 | 1.75 | 4.36 | 2.86 | 1.66 | 5.84 | 3.60 |
| 180-2 | $C_{12}$ | 5 | 1.94 | 12.91 | 2.86 | 2.15 | 2.83 | 3.01 |
| 180-3 | $C_{14}$ | 5 | 8.22 | 15.73 | 25.64 | 12.77 | 22.06 | 32.14 |
| 180-4 | $C_{16}$ | 5 | 0.94 | 1.09 | 1.21 | 1.01 | 0.99 | 1.10 |
| 180-5 | $C_{18}$ | 5 | 3.94 | 4.38 | 4.35 | 3.91 | 4.36 | 4.47 |
| 180-6 | iso-$C_{18}$ | 5 | 1.08 | 1.03 | 0.94 | 1.04 | 1.14 | 0.96 |
| 78-1 | $C_{10}$ | 10 | — | 3.18 | 2.38 | — | 3.64 | 2.76 |
| 78-2 | $C_{12}$ | 10 | — | 109.44 | 37.06 | — | 300.00 | 44.11 |
| 78-3 | $C_{14}$ | 10 | — | 24.83 | 9.99 | — | 28.81 | 15.15 |
| 78-4 | $C_{16}$ | 10 | — | 3.45 | 1.51 | — | 3.81 | 1.24 |
| 78-5 | $C_{18}$ | 10 | — | 17.44 | 6.77 | — | 23.61 | 7.30 |
| 78-6 | iso-$C_{18}$ | 10 | — | 11.51 | 4.19 | — | 13.82 | 4.65 |
| 181-1 | $C_{10}$ | 20 | 3.31 | 2.54 | 2.50 | 4.06 | 4.46 | 3.95 |
| 181-2 | $C_{12}$ | 20 | 3.65 | 3.12 | 2.28 | 4.70 | 4.15 | 3.97 |
| 181-3 | $C_{14}$ | 20 | 3.24 | 4.19 | 8.78 | 4.75 | 5.96 | 12.62 |
| 181-4 | $C_{16}$ | 20 | 2.53 | 3.46 | 3.07 | 3.17 | 3.61 | 3.76 |
| 181-5 | $C_{18}$ | 20 | 17.40 | 19.62 | 20.22 | 19.18 | 23.75 | 26.78 |
| 181-6 | iso-$C_{18}$ | 20 | 6.45 | 7.63 | 13.63 | 8.61 | 9.27 | 15.66 |

The above-tabulated data demonstrates a wide variety of ethoxylated alcohol compounds which are suitable for use in the synergistic anti-stat blend of the present invention. In general, an alcohol chain length of about $C_{16}$–$C_{18}$ of the ethoxylate component yielded better results. In general, also, a lesser ethoxylate content provided better anti-stat properties.

Example 9

The procedure of Example 8 was repeated with the formulation of Table 19 using an anti-stat blend of a maleic anhydride $C_{10}$ alcohol component and the ethoxylated alcohol regimen of Example 8.

TABLE 21

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 21-1 | $C_{10}$ | 2 | 22.12 | 45.73 | 111.79 | 26.69 | 81.22 | 157.92 |
| 21-2 | $C_{12}$ | 2 | 7.87 | 29.48 | 108.51 | 11.23 | 33.27 | 137.04 |
| 21-3 | $C_{14}$ | 2 | 1.86 | 4.12 | 8.27 | 1.87 | 4.10 | 11.58 |
| 21-4 | $C_{16}$ | 2 | 0.83 | 1.34 | 1.38 | 0.82 | 1.35 | 1.54 |
| 21-5 | $C_{18}$ | 2 | 1.25 | 1.55 | 2.69 | 1.23 | 1.59 | 3.08 |
| 21-6 | iso-$C_{18}$ | 2 | >100 | >100 | — | >100 | >100 | — |
| 22-1 | $C_{10}$ | 5 | 34.64 | 83.32 | 78.46 | 47.82 | 70.95 | 130.89 |
| 22-2 | $C_{12}$ | 5 | 10.94 | 57.59 | 70.50 | 16.91 | 85.80 | 91.22 |
| 22-3 | $C_{14}$ | 5 | 3.75 | 9.93 | 17.53 | 5.48 | 13.08 | 19.98 |
| 22-4 | $C_{16}$ | 5 | 2.14 | 2.95 | 4.93 | 2.43 | 2.91 | 5.34 |
| 22-5 | $C_{18}$ | 5 | 1.56 | 2.23 | 2.97 | 1.56 | 2.44 | 3.25 |

TABLE 21-continued

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 22-6 | iso-$C_{18}$ | 5 | 2.43 | 2.31 | 3.00 | 3.85 | 3.94 | 4.19 |
| 23-1 | $C_{10}$ | 10 | 3.17 | 4.07 | 5.41 | 4.22 | 5.65 | 6.83 |
| 23-2 | $C_{12}$ | 10 | 5.85 | 8.12 | 10.24 | 9.18 | 13.40 | 15.16 |
| 23-3 | $C_{14}$ | 10 | 4.96 | 11.08 | 14.42 | 9.10 | 16.91 | 21.03 |
| 23-4 | $C_{16}$ | 10 | 12.23 | 34.09 | 40.52 | 22.52 | 39.54 | 57.05 |
| 23-5 | $C_{18}$ | 10 | 2.25 | 2.76 | 4.06 | 2.67 | 3.58 | 3.86 |
| 23-6 | iso-$C_{18}$ | 10 | 13.62 | 13.02 | 11.61 | 17.18 | 20.60 | 19.29 |
| 24-1 | $C_{10}$ | 20 | 73.18 | 127.11 | 156.00 | 95.09 | 129.06 | 164.50 |
| 24-2 | $C_{12}$ | 20 | 41.22 | 41.16 | 50.49 | 44.06 | 46.85 | 45.72 |
| 24-3 | $C_{14}$ | 20 | 37.43 | 46.04 | 51.00 | 75.96 | 59.72 | 68.38 |
| 24-4 | $C_{16}$ | 20 | 38.55 | 26.09 | 17.98 | 42.38 | 41.07 | 24.86 |
| 24-5 | $C_{18}$ | 20 | 28.38 | 30.26 | 109.17 | 39.17 | 50.65 | 78.37 |
| 24-6 | iso-$C_{18}$ | 20 | 60.86 | 91.75 | 58.89 | 66.49 | 117.59 | 96.06 |

As in Example 8 using the phthalate component in the blend, ethoxylate chain lengths of about $C_{16}$–$C_{18}$ provided better anti-stat properties. A lesser ethoxylate content exhibited better anti-stat performance too.

Example 10

The procedure of Example 8 was repeated with the formulation of Table 19 using an anti-stat blend of a maleic anhydride $C_{12}$ alcohol component and the ethoxylated alcohol regimen of Example 8.

TABLE 22

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 191-1 | $C_{10}$ | 2 | 19.67 | 18.21 | 400 | 27.02 | 26.32 | 400 |
| 191-2 | $C_{12}$ | 2 | 3.45 | 6.78 | 6.61 | 4.81 | 6.43 | 6.92 |
| 191-3 | $C_{14}$ | 2 | 0.76 | 0.96 | 1.32 | 0.78 | 0.96 | 1.39 |
| 191-4 | $C_{16}$ | 2 | 1.14 | 1.51 | 1.78 | 1.13 | 1.52 | 1.84 |
| 191-5 | $C_{18}$ | 2 | 1.13 | 1.65 | 2.52 | 1.13 | 1.64 | 2.60 |
| 191-6 | iso-$C_{18}$ | 2 | 3.11 | 3.56 | 3.62 | 3.15 | 3.69 | 3.99 |
| 192-1 | $C_{10}$ | 5 | 7.93 | 19.13 | 21.45 | 10.07 | 15.38 | 29.05 |
| 192-2 | $C_{12}$ | 5 | 2.13 | 4.95 | 5.23 | 2.45 | 6.09 | 7.64 |
| 192-3 | $C_{14}$ | 5 | 2.18 | 6.02 | 6.37 | 2.34 | 6.47 | 7.70 |
| 192-4 | $C_{16}$ | 5 | 1.33 | 2.64 | 4.05 | 1.47 | 3.07 | 5.25 |
| 192-5 | $C_{18}$ | 5 | 0.49 | 0.85 | 1.11 | 0.50 | 0.86 | 1.21 |
| 192-6 | iso-$C_{18}$ | 5 | 2.50 | 2.21 | 1.81 | 2.36 | 2.27 | 1.59 |
| 193-1 | $C_{10}$ | 10 | 2.83 | 3.51 | 2.48 | 3.56 | 3.43 | 3.27 |
| 193-2 | $C_{12}$ | 10 | 2.98 | 4.03 | 8.82 | 3.90 | 6.58 | 18.88 |
| 193-3 | $C_{14}$ | 10 | 1.19 | 2.81 | 11.01 | 2.90 | 10.69 | 17.34 |
| 193-4 | $C_{16}$ | 10 | 2.05 | 4.99 | 17.17 | 2.74 | 6.12 | 25.77 |
| 193-5 | $C_{18}$ | 10 | 0.51 | 0.69 | 1.37 | 0.49 | 0.76 | 1.32 |
| 193-6 | iso-$C_{18}$ | 10 | 1.43 | 1.32 | 1.28 | 1.79 | 2.12 | 2.50 |
| 194-1 | $C_{10}$ | 20 | 6.88 | 10.52 | 15.08 | 39.68 | 28.59 | 23.93 |
| 194-2 | $C_{12}$ | 20 | 2.88 | 2.85 | 3.73 | 2.56 | 3.09 | 4.15 |
| 194-3 | $C_{14}$ | 20 | 1.95 | 1.44 | 2.43 | 3.04 | 2.74 | 4.02 |
| 194-4 | $C_{16}$ | 20 | 90.17 | 59.72 | 121.97 | 68.98 | 105.33 | 133.67 |
| 194-5 | $C_{18}$ | 20 | 9.33 | 4.68 | 4.86 | 11.69 | 5.75 | 6.86 |
| 194-6 | iso-$C_{18}$ | 20 | 25.89 | 12.56 | 8.68 | 40.03 | 14.15 | 12.76 |

In general, the decay times for the $C_{10}$ maleate samples of Example 9 appear to be slightly better than the $C_{12}$ maleate samples of this example. At the 2 and 5 mole ethoxylate level, a chain length of about $C_{16}$–$C_{18}$ appeared preferable; while for the 10 mole ethoxylate, a chain length of around $C_{14}$ appeared preferable.

Example 11

The procedure for Example 8 was repeated with the formulation of Table 19 using an anti-stat blend of a maleic anhydride $C_{14}$ alcohol component and the ethoxylated alcohol regimen of Example 8.

TABLE 23

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 1-1 | $C_{10}$ | 2 | 1.48 | 2.20 | 3.61 | 1.69 | 2.75 | 3.98 |
| 1-2 | $C_{12}$ | 2 | 1.22 | 2.07 | 1.71 | 1.62 | 2.24 | 1.79 |
| 1-3 | $C_{14}$ | 2 | 0.47 | 0.74 | 0.90 | 0.53 | 0.79 | 0.89 |
| 1-4 | $C_{16}$ | 2 | 0.44 | 0.59 | 0.88 | 0.48 | 0.69 | 0.87 |
| 1-5 | $C_{18}$ | 2 | 1.32 | 1.80 | 2.22 | 1.46 | 1.86 | 2.27 |
| 1-6 | iso-$C_{18}$ | 2 | 1.67 | 2.18 | 2.32 | 1.77 | 2.22 | 2.44 |
| 2-1 | $C_{10}$ | 5 | 1.21 | 1.06 | 0.92 | 1.32 | 1.13 | 0.94 |

TABLE 23-continued

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 2-2 | $C_{12}$ | 5 | 1.13 | 0.47 | 1.79 | 1.28 | 0.54 | 1.80 |
| 2-3 | $C_{14}$ | 5 | 0.39 | 0.44 | 0.47 | 0.46 | 0.51 | 0.46 |
| 2-4 | $C_{16}$ | 5 | 0.37 | 0.43 | 0.52 | 0.40 | 0.50 | 0.53 |
| 2-5 | $C_{18}$ | 5 | 0.41 | 0.54 | 0.69 | 0.43 | 0.64 | 0.85 |
| 2-6 | iso-$C_{18}$ | 5 | 0.61 | 0.80 | 0.99 | 0.62 | 0.86 | 1.01 |
| 3-1 | $C_{10}$ | 10 | 0.68 | 0.64 | 0.91 | 0.75 | 0.63 | 0.96 |
| 3-2 | $C_{12}$ | 10 | 0.68 | 0.83 | 1.57 | 0.75 | 0.90 | 1.74 |
| 3-3 | $C_{14}$ | 10 | 0.73 | 0.93 | 1.55 | 0.74 | 0.95 | 1.61 |
| 3-4 | $C_{16}$ | 10 | 0.53 | 0.81 | 1.19 | 0.53 | 0.86 | 1.12 |
| 3-5 | $C_{18}$ | 10 | 0.41 | 0.46 | 0.68 | 0.42 | 0.50 | 0.68 |
| 3-6 | iso-$C_{18}$ | 10 | 0.82 | 0.78 | 1.00 | 0.85 | 0.85 | 1.39 |
| 4-1 | $C_{10}$ | 20 | 14.78 | 21.69 | 41.44 | 20.10 | 33.44 | 71.23 |
| 4-2 | $C_{12}$ | 20 | 2.57 | 2.43 | 4.56 | 3.34 | 4.07 | 5.44 |
| 4-3 | $C_{14}$ | 20 | 8.12 | 7.91 | 8.87 | 9.37 | 14.58 | 11.97 |
| 4-4 | $C_{16}$ | 20 | 2.22 | 4.96 | 2.88 | 2.58 | 4.77 | 3.71 |
| 4-5 | $C_{18}$ | 20 | 2.13 | 2.95 | 2.41 | 2.11 | 3.06 | 2.82 |
| 4-6 | iso-$C_{18}$ | 20 | 3.11 | 4.04 | 2.24 | 4.26 | 4.00 | 5.83 |

Clearly, the 10 mole ethoxylate component was quite effective at all alcohol chain lengths. All of the candidate blends as a group provided better anti-stat properties compared to the blends of Example 10.

Example 12

The procedure of Example 8 was repeated with the formulation of Table 19 using an anti-stat blend of a maleic anhydride $C_{16}$ alcohol component and the ethoxylated alcohol regimen of Example 8.

TABLE 24

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 6-1 | $C_{10}$ | 2 | 1.56 | 2.97 | 3.06 | 1.70 | 3.28 | 3.62 |
| 6-2 | $C_{12}$ | 2 | 0.83 | 1.55 | 2.23 | 0.91 | 2.06 | 3.42 |
| 6-3 | $C_{14}$ | 2 | 0.84 | 1.08 | 2.51 | 0.98 | 1.18 | 2.22 |
| 6-4 | $C_{16}$ | 2 | 1.18 | 1.56 | 2.31 | 1.32 | 1.69 | 2.36 |
| 6-5 | $C_{18}$ | 2 | 1.54 | 1.72 | 2.96 | 1.71 | 1.86 | 3.78 |
| 6-6 | iso-$C_{18}$ | 2 | 1.24 | 1.73 | 2.70 | 1.39 | 1.77 | 2.81 |
| 7-1 | $C_{10}$ | 5 | 1.26 | 1.56 | 2.68 | 1.74 | 1.90 | 3.06 |
| 7-2 | $C_{12}$ | 5 | 0.71 | 0.58 | 0.82 | 0.53 | 0.60 | 0.90 |
| 7-3 | $C_{14}$ | 5 | 1.91 | 2.05 | 2.35 | 2.51 | 1.86 | 2.78 |
| 7-4 | $C_{16}$ | 5 | 1.59 | 2.66 | 3.36 | 1.86 | 3.06 | 3.68 |
| 7-5 | $C_{18}$ | 5 | 1.06 | 1.42 | 1.92 | 1.12 | 1.41 | 2.38 |
| 7-6 | iso-$C_{18}$ | 5 | 0.76 | 1.22 | 1.59 | 0.84 | 1.25 | 1.98 |
| 8-1 | $C_{10}$ | 10 | 1.75 | 3.70 | 7.64 | 1.80 | 4.12 | 8.10 |
| 8-2 | $C_{12}$ | 10 | 1.16 | 1.53 | 2.02 | 1.34 | 1.83 | 2.36 |
| 8-3 | $C_{14}$ | 10 | 1.34 | 2.18 | 4.15 | 1.48 | 2.07 | 3.95 |
| 8-4 | $C_{16}$ | 10 | 0.58 | 0.76 | 1.13 | 0.69 | 0.78 | 1.10 |
| 8-5 | $C_{18}$ | 10 | 0.42 | 0.55 | 0.81 | 0.45 | 0.65 | 0.80 |
| 8-6 | iso-$C_{18}$ | 10 | 0.58 | 1.05 | 0.93 | 0.99 | 1.68 | 0.96 |
| 9-1 | $C_{10}$ | 20 | 4.72 | 5.76 | 8.81 | 6.26 | 8.82 | 10.80 |
| 9-2 | $C_{12}$ | 20 | 1.93 | 2.44 | 2.86 | 2.04 | 2.97 | 3.33 |
| 9-3 | $C_{14}$ | 20 | 6.60 | 8.33 | 16.42 | 7.78 | 13.92 | 21.58 |
| 9-4 | $C_{16}$ | 20 | 0.72 | 0.94 | 1.18 | 0.80 | 1.04 | 1.27 |
| 9-5 | $C_{18}$ | 20 | 1.24 | 2.20 | 2.73 | 1.40 | 2.38 | 3.13 |
| 9-6 | iso-$C_{18}$ | 20 | 0.65 | 0.78 | 1.01 | 0.78 | 0.83 | 1.06 |

Lower ethoxylate values appear slightly better based on this data. Note the excellent results for the iso-stearyl ethoxylates compared to the previous two examples.

Example 13

The procedure of Example 8 was repeated with the formulation of Table 19 using an anti-stat blend of a maleic anhydride Adol 42 alcohol component and the oleyl-cetyl alcohol regimen of Example 8.

TABLE 25

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 187-1 | $C_{10}$ | 2 | 3.99 | 2.98 | 3.41 | 4.30 | 3.43 | 3.85 |
| 187-2 | $C_{12}$ | 2 | 1.04 | 1.60 | 2.65 | 1.00 | 1.70 | 2.60 |
| 187-3 | $C_{14}$ | 2 | 1.63 | 2.38 | 3.81 | 1.82 | 2.63 | 4.30 |
| 187-4 | $C_{16}$ | 2 | 1.60 | 2.26 | 2.83 | 1.59 | 2.54 | 3.27 |
| 187-5 | $C_{18}$ | 2 | 2.68 | 4.15 | 5.40 | 2.70 | 3.98 | 5.72 |
| 187-6 | iso-$C_{18}$ | 2 | 3.11 | 4.04 | 5.78 | 3.32 | 4.63 | 5.84 |
| 184-1 | $C_{10}$ | 5 | 1.96 | 2.69 | 3.46 | 2.09 | 2.58 | 3.98 |
| 184-2 | $C_{12}$ | 5 | 1.57 | 2.72 | 3.70 | 1.61 | 2.73 | 4.08 |
| 184-3 | $C_{14}$ | 5 | 0.81 | 1.27 | 1.85 | 0.88 | 1.35 | 1.95 |
| 184-4 | $C_{16}$ | 5 | 1.43 | 2.27 | 3.05 | 1.47 | 2.45 | 3.07 |
| 184-5 | $C_{18}$ | 5 | 1.41 | 1.79 | 2.54 | 1.42 | 2.06 | 2.70 |
| 184-6 | iso-$C_{18}$ | 5 | 1.34 | 1.93 | 2.75 | 1.30 | 2.36 | 3.01 |
| 183-1 | $C_{10}$ | 10 | 0.46 | 0.62 | 0.56 | 0.48 | 0.62 | 0.67 |
| 183-2 | $C_{12}$ | 10 | 1.18 | 1.69 | 2.01 | 1.26 | 1.80 | 2.09 |
| 183-3 | $C_{14}$ | 10 | 1.20 | 1.85 | 2.10 | 1.28 | 1.97 | 2.35 |
| 183-4 | $C_{16}$ | 10 | 0.82 | 1.13 | 1.41 | 0.92 | 1.20 | 1.62 |

Example 14

The procedure of Example 8 was repeated with the formulation of Table 19 using an anti-stat blend of a maleic capped $C_{18}$ alcohol component and the ethoxylated alcohol regimen of Example 8.

TABLE 25-continued

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 183-5 | $C_{18}$ | 10 | 0.73 | 1.02 | 1.22 | 0.78 | 1.09 | 1.49 |
| 183-6 | iso-$C_{18}$ | 10 | 1.66 | 2.23 | 3.23 | 1.61 | 2.42 | 3.70 |
| 186-1 | $C_{10}$ | 20 | 2.23 | 4.21 | 2.46 | 1.97 | 3.81 | 3.36 |
| 186-2 | $C_{12}$ | 20 | 1.13 | 1.75 | 1.76 | 1.24 | 2.08 | 2.00 |
| 186-3 | $C_{14}$ | 20 | 4.08 | 5.97 | 6.86 | 4.69 | 7.05 | 10.49 |
| 186-4 | $C_{16}$ | 20 | 3.83 | 6.39 | 8.98 | 4.14 | 6.95 | 10.19 |
| 186-5 | $C_{18}$ | 20 | 3.04 | 4.67 | 7.73 | 3.29 | 5.81 | 9.00 |
| 186-6 | iso-$C_{18}$ | 20 | 2.52 | 4.75 | 4.76 | 2.67 | 4.58 | 5.37 |

The performance of various blends again is demonstrated. The 10 mole ethoxylate alcohols appear to provide the best results based on these data. Also, the $C_{10}$ and $C_{12}$ alcohol ethoxylates performed better than did the longer chain versions.

TABLE 26

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 13-1 | $C_{10}$ | 2 | 4.62 | 7.82 | 12.95 | 5.76 | 8.88 | 13.36 |
| 13-2 | $C_{12}$ | 2 | 2.80 | 3.07 | 3.59 | 3.52 | 3.62 | 3.77 |
| 13-3 | $C_{14}$ | 2 | 1.95 | 1.95 | 2.64 | 2.35 | 2.24 | 2.63 |
| 13-4 | $C_{16}$ | 2 | 4.63 | 4.16 | 5.36 | 4.38 | 4.56 | 5.68 |
| 13-5 | $C_{18}$ | 2 | 4.59 | 5.16 | 8.37 | 5.09 | 5.73 | 8.34 |
| 13-6 | iso-$C_{18}$ | 2 | 1.82 | 1.97 | 2.46 | 1.88 | 2.34 | 2.92 |
| 14-1 | $C_{10}$ | 5 | 1.03 | 1.87 | 4.24 | 1.07 | 2.08 | 4.67 |
| 14-2 | $C_{12}$ | 5 | 1.32 | 2.09 | 2.54 | 1.59 | 2.23 | 3.02 |
| 14-3 | $C_{14}$ | 5 | 0.96 | 0.71 | 1.07 | 0.96 | 1.08 | 1.07 |
| 14-4 | $C_{16}$ | 5 | 2.35 | 2.88 | 4.02 | 2.29 | 3.03 | 4.10 |
| 14-5 | $C_{18}$ | 5 | 4.78 | 5.82 | 6.84 | 5.17 | 7.50 | 6.74 |
| 14-6 | iso-$C_{18}$ | 5 | 1.59 | 1.80 | 2.27 | 1.58 | 1.83 | 2.32 |
| 15-1 | $C_{10}$ | 10 | 2.82 | 3.96 | 4.93 | 3.64 | 4.18 | 6.35 |
| 15-2 | $C_{12}$ | 10 | 1.39 | 2.19 | 4.28 | 1.56 | 2.52 | 4.02 |
| 15-3 | $C_{14}$ | 10 | 1.25 | 1.50 | 2.29 | 1.36 | 1.76 | 2.31 |
| 15-4 | $C_{16}$ | 10 | 2.37 | 3.02 | 5.33 | 2.62 | 3.46 | 5.66 |
| 15-5 | $C_{18}$ | 10 | 1.91 | 2.31 | 3.11 | 2.10 | 2.72 | 3.58 |
| 15-6 | iso-$C_{18}$ | 10 | 0.72 | 0.96 | 1.33 | 1.03 | 1.05 | 1.48 |
| 16-1 | $C_{10}$ | 20 | 12.45 | 18.23 | 47.20 | 14.67 | 20.88 | 75.55 |
| 16-2 | $C_{12}$ | 20 | 4.98 | 8.67 | 18.96 | 4.61 | 9.04 | 25.64 |
| 16-3 | $C_{14}$ | 20 | 2.88 | 3.55 | 6.74 | 3.44 | 4.59 | 7.65 |
| 16-4 | $C_{16}$ | 20 | 1.43 | 2.64 | 5.11 | 1.46 | 2.68 | 5.44 |
| 16-5 | $C_{18}$ | 20 | 1.44 | 2.67 | 6.76 | 1.69 | 2.84 | 7.12 |
| 16-6 | iso-$C_{18}$ | 20 | 1.16 | 2.23 | 3.99 | 1.41 | 2.48 | 4.62 |

All of the iso-stearyl alcohol ethoxylates provided quite good anti-stat properties as did the $C_{14}$ alcohol ethoxylates. A trend can be seen between Examples 10–14 in that the maleic anhydride capped $C_{16}$ alcohol appears to result in a relatively more effective anti-stat blend independent of the ethoxylated alcohol component.

Example 15

The procedure of Example 8 was repeated with the formulation of Table 19 using an anti-stat blend of a maleic capped iso-$C_{18}$ alcohol component and the ethoxylated alcohol regimen of Example 8.

TABLE 27

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 17-1 | $C_{10}$ | 2 | 4.98 | 7.64 | 12.67 | 4.88 | 7.69 | 13.99 |
| 17-2 | $C_{12}$ | 2 | 2.03 | 3.29 | 4.45 | 2.04 | 3.29 | 5.71 |
| 17-3 | $C_{14}$ | 2 | 2.16 | 2.40 | 2.94 | 1.69 | 2.48 | 3.58 |
| 17-4 | $C_{16}$ | 2 | 2.19 | 2.70 | 4.08 | 2.45 | 2.73 | 4.69 |
| 17-5 | $C_{18}$ | 2 | 3.17 | 4.08 | 5.17 | 3.69 | 4.10 | 7.11 |
| 17-6 | iso-$C_{18}$ | 2 | 2.86 | 4.04 | 5.48 | 3.39 | 4.65 | 5.98 |
| 18-1 | $C_{10}$ | 5 | 1.29 | 2.14 | 2.51 | 1.54 | 2.41 | 2.53 |
| 18-2 | $C_{12}$ | 5 | 0.32 | 0.50 | 0.64 | 0.36 | 0.74 | 0.70 |
| 18-3 | $C_{14}$ | 5 | 0.70 | 1.46 | 1.39 | 0.86 | 2.23 | 1.60 |
| 18-4 | $C_{16}$ | 5 | 1.50 | 2.59 | 3.09 | 1.58 | 2.85 | 3.57 |
| 18-5 | $C_{18}$ | 5 | 1.10 | 1.85 | 2.09 | 1.29 | 1.91 | 2.62 |
| 18-6 | iso-$C_{18}$ | 5 | 2.93 | 3.09 | 3.63 | 2.71 | 3.30 | 4.11 |
| 19-1 | $C_{10}$ | 10 | 6.53 | 9.49 | 18.14 | 6.75 | 12.01 | 19.28 |
| 19-2 | $C_{12}$ | 10 | 3.21 | 5.63 | 6.48 | 3.54 | 6.52 | 8.47 |
| 19-3 | $C_{14}$ | 10 | 1.33 | 1.51 | 1.85 | 1.43 | 1.69 | 2.08 |
| 19-4 | $C_{16}$ | 10 | 0.97 | 1.34 | 1.75 | 1.06 | 1.41 | 2.01 |
| 19-5 | $C_{18}$ | 10 | 0.91 | 1.18 | 1.66 | 0.98 | 1.28 | 1.74 |
| 19-6 | iso-$C_{18}$ | 10 | 4.17 | 5.33 | 8.19 | 5.16 | 5.94 | 10.34 |
| 20-1 | $C_{10}$ | 20 | 35.24 | 65.41 | 72.59 | 85.87 | 69.59 | 74.52 |

TABLE 27-continued

| Sample No. | Fatty Alcohol Chain Length | Ethylene Oxide (moles) | Avg. Decay Time (sec) | | | | | |
|---|---|---|---|---|---|---|---|---|
| | | | +5 KV | | | −5 KV | | |
| | | | Conditioning Time (Days) | | | | | |
| | | | 0 | 1 | 7 | 0 | 1 | 7 |
| 20-2 | $C_{12}$ | 20 | >100 | >100 | >183.16 | >100 | >100 | >100 |
| 20-3 | $C_{14}$ | 20 | 13.51 | 12.43 | 21.76 | 17.39 | 16.87 | 27.89 |
| 20-4 | $C_{16}$ | 20 | 4.31 | 7.32 | 12.50 | 5.27 | 8.53 | 15.45 |
| 20-5 | $C_{18}$ | 20 | 3.32 | 5.52 | 10.69 | 4.26 | 6.09 | 12.04 |
| 20-6 | iso-$C_{18}$ | 20 | 6.30 | 9.27 | 9.29 | 7.34 | 10.25 | 10.18 |

The 5 mole ethoxylate alcohols appear to function more effectively with the maleic capped iso-stearly alcohol than did the other ethoxylated alcohols. The trend commented on in Example 14 also held in this example, viz, that the ethoxylated $C_{16}$ alcohols appear the best when blended with maleic capped alcohols of varying chain lengths.

Example 16

In order to demonstrate the synergistic anti-stat action exhibited by the novel anti-stat, formulations were compounded with each component separtely and a blend of the two components. The following formulations were compounded.

TABLE 2

| | Formulations (wt-parts) | | |
|---|---|---|---|
| | Sample No. | | |
| Ingredient | 89-1 | 89-2 | 89-3 |
| VC 47B PVC | 100 | 100 | 100 |
| DOA | 10 | 10 | 6 |
| Mineral Oil | 0.4 | 0.4 | 0.4 |
| Thermolite 108 | 3 | 3 | 3 |
| Adol 42-maleate* | — | 8 | 4 |
| Varstat 10 | 8 | — | 4 |

*Adol 42/maleic anhydride

The two comparative formulations (89-1 and 89-2) and the novel formulation (89-3) each were subjected to charge dissipation testing (10% cut-off) with the following results being recorded.

TABLE 29

| Sample No. | Decay Rate (sec) | |
|---|---|---|
| | +5 KV | −5 KV |
| 89-1 | 140 | >140 |
| 89-2 | >70 | >100 |
| 89-3 | 1.29 | 1.37 |

These results unquestionably establish the unexpectedness in anti-stat performance which the combination of components comprising the novel anti-stat exhibits. Based on the anti-stat performance which each component separately exhibits, the expectation that the combination would fare significantly better certainly is lacking. Yet, the combination is synergistic in its performance.

I claim:

1. A polyvinyl chloride polymeric (PVC) composition which dissipates charge phenomena which comprises polyvinyl chloride polymeric material and an effective amount of an anti-stat comprising both an ethoxylated fat-forming alcohol and a dibasic acid-capped fat-forming alcohol; said ethoxylated fat-forming alcohol being the ethoxylate of an alcohol having a chain length from about 8 to about 36 carbon atoms, said alcohol may be saturated or unsaturated, and may be linear or branched in the structure and may be substituted with substituents wherein said substituents are alkyl groups, ester groups, ether groups or halide, the the number of moles of ethylene oxide added to said fatty alcohol ranging from 2 moles up to about 30 moles ethylene oxide per mole of fatty alcohol; said dibasic acid-capped fat-forming alcohol comprising an ester of a fatty alcohol having a chain length from about 8 carbon atoms to about 36 carbon atoms, said fatty alcohol may be saturated or unsaturated and may be linear or branched and may be substituted with substituents wherein said substituents are alkyl groups, ester groups, ether groups or halide, said dibasic acid reacted with said fatty alcohol having the general structure:

wherein R is an aromatic group or a $C_2$–$C_{36}$ aliphatic group.

2. The PVC composition of claim 1 wherein said chain length ranges from about $C_{10}$ to $C_{18}$.

3. The PVC composition of claim 1 wherein said effective amount comprises between about 2 and 15 parts of said anti-stat per 100 weight parts of said polyvinyl chloride.

4. The PVC composition of claim 1 wherein the proportion of said ethoxylated fat-forming alcohol in said anti-stat ranges from between about 1 and 10 weight parts.

5. The PVC composition of claim 1 wherein said dibasic acid of said dibasic acid-capped fat-forming alcohol is selected from the group consisting of oxalic acid, phthalic acid, maleic acid, glutaric acid, adipic acid, anhydrides of said acids, dimerized fatty acid, and mixtures thereof.

6. The PVC composition of claim 1 wherein the proportion of plasticizer incorporated into said composition ranges from between about 0 and 25 weight parts per 100 weight parts of said polyvinyl chloride.

7. The PVC composition of claim 1 wherein said composition is clear.

8. The composition of claim 1 wherein said polyvinyl chloride polymeric composition is selected from a polyvinyl chloride homopolymer or a polyvinyl chloride copolymer.

9. The composition of claim 8 wherein said polyvinyl chloride copolymer is a copolymer between polyvinyl chloride and a compound selected from a vinyl ester, an olefin, an acrylate, and mixtures thereof.

10. A PVC composition as in one of claims 1–9 wherein said ethoxylated fat-forming alcohol is selected from a member of the group consisting of ethoxylated oleyl alcohols or ethoxylated isostearyl alcohols and said dibasic acid-capped fat-forming alcohol comprises a maleic anhydride capped oleyl alcohol.

* * * * *